United States Patent
Jang

(10) Patent No.: US 11,490,009 B2
(45) Date of Patent: Nov. 1, 2022

(54) OPTICAL IMAGE STABILIZATION CIRCUIT AND OPTICAL IMAGE STABILIZATION DEVICE FOR OBJECT POSITION CORRECTION USING FACE TRACKING

(71) Applicant: SAMSUNG ELECTRO-MECHANICS CO., LTD., Suwon-si (KR)

(72) Inventor: Nam Hong Jang, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 0 days.

(21) Appl. No.: 17/212,188

(22) Filed: Mar. 25, 2021

(65) Prior Publication Data

US 2022/0150408 A1 May 12, 2022

(30) Foreign Application Priority Data

Nov. 10, 2020 (KR) .................. 10-2020-0149367

(51) Int. Cl.
*H04N 5/232* (2006.01)
*G06T 7/20* (2017.01)
*G06V 40/16* (2022.01)

(52) U.S. Cl.
CPC ........... *H04N 5/23254* (2013.01); *G06T 7/20* (2013.01); *G06V 40/161* (2022.01); *H04N 5/23258* (2013.01); *H04N 5/23287* (2013.01)

(58) Field of Classification Search
CPC ............. H04N 5/23212; H04N 5/30; H04N 5/232127; H04N 5/232945; H04N 5/232122; H04N 5/23261; H04N 5/23209; H04N 5/23219; H04N 5/23254; H04N 5/23258; H04N 5/2328; H04N 5/23287;
(Continued)

(56) References Cited

U.S. PATENT DOCUMENTS

2010/0149352 A1 6/2010 Jang et al.
2012/0121126 A1 5/2012 Hwang et al.
(Continued)

FOREIGN PATENT DOCUMENTS

JP 2007-41570 A 2/2007
KR 10-2007-0019517 A 2/2007
(Continued)

OTHER PUBLICATIONS https://www.youtube.com/watch?v=iSkVmM8BhT4.
(Continued)

*Primary Examiner* — Lin Ye
*Assistant Examiner* — Tuan H Le
(74) *Attorney, Agent, or Firm* — NSIP Law

(57) ABSTRACT

An optical image stabilization (OIS) circuit for object position correction includes a facial detection unit generating a face position signal including coordinate information of a face, based on an image signal input from an image sensor; a hand-shake detector generating a hand-shake position signal corresponding to hand-shake, based on a sensing signal input from a gyro sensor; a operation unit generating a composite position signal based on the face position signal and the hand-shake position signal; and a control unit controlling a position of a lens module, based on the composite position signal.

20 Claims, 5 Drawing Sheets

(58) Field of Classification Search
CPC ...... H04N 5/144; H04N 5/23264; G06T 7/20; G06T 2207/10004; G06K 9/00261; G06K 9/00228; G02B 27/646
See application file for complete search history.

(56) References Cited

U.S. PATENT DOCUMENTS

| | | | |
|---|---|---|---|
| 2012/0163784 A1* | 6/2012 | Saito | G02B 27/646 396/55 |
| 2016/0173783 A1 | 6/2016 | Kim et al. | |
| 2018/0103207 A1* | 4/2018 | Miyazawa | H04N 5/23287 |

FOREIGN PATENT DOCUMENTS

| | | |
|---|---|---|
| KR | 10-2010-0067406 A | 6/2010 |
| KR | 10-2016-0070589 A | 6/2016 |
| KR | 10-1740231 B1 | 5/2017 |

OTHER PUBLICATIONS

Notice of Reason for Rejection dated Nov. 2, 2021, in counterpart Korean Patent Application No. 10-2020-0149367 (8 pages in English and 5 pages in Korean).

* cited by examiner

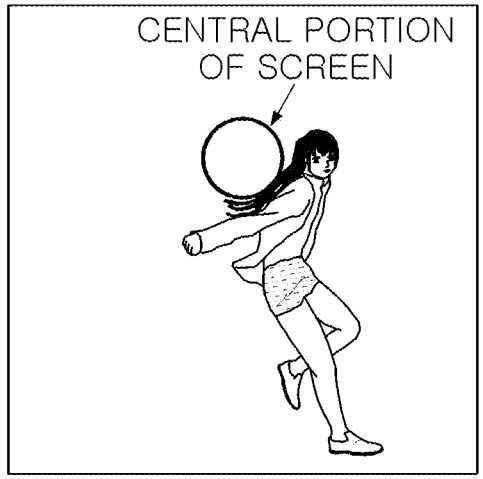
FIG. 8A — BEFORE APPLYING FACE TRACKING OIS
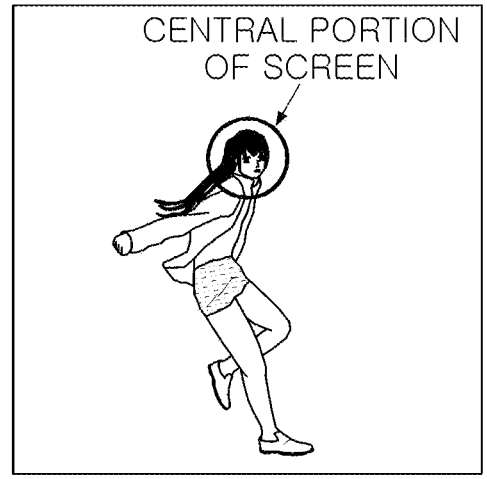
FIG. 8B — AFTER APPLYING FACE TRACKING OIS
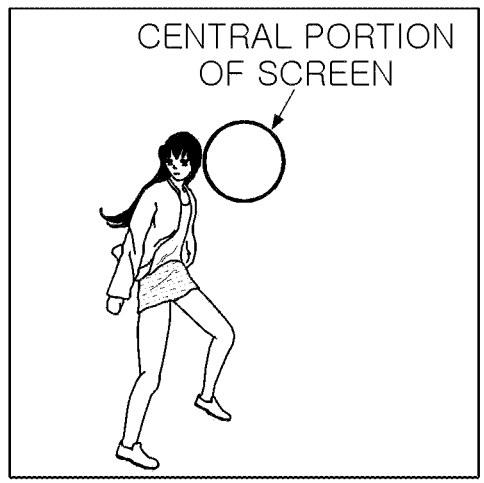
FIG. 9A — BEFORE APPLYING FACE TRACKING OIS
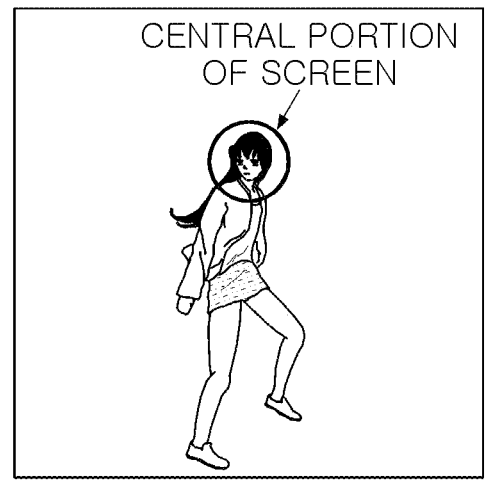
FIG. 9B — AFTER APPLYING FACE TRACKING OIS

OPTICAL IMAGE STABILIZATION CIRCUIT AND OPTICAL IMAGE STABILIZATION DEVICE FOR OBJECT POSITION CORRECTION USING FACE TRACKING

CROSS-REFERENCE TO RELATED APPLICATION(S)

This application claims the benefit under 35 USC 119(a) of Korean Patent Application No. 10-2020-0149367 filed on Nov. 10, 2020 in the Korean Intellectual Property Office, the entire disclosure of which is incorporated herein by reference for all purposes.

BACKGROUND

1. Field

The following description relates to an optical image stabilization (OIS) circuit and an OIS device for object position correction using face tracking.

2. Description of Background

In general, optical image stabilization (OIS) applied to a camera module demands relatively high correction performance for hand-shake, as quality competition intensifies. In the latest smartphones, the main goal is to improve quality of photos and videos taken under extreme shaking conditions. In order to satisfy this, hand-shake information of a user may be received from a gyro sensor mounted on a camera phone, and correction thereof may be performed.

However, conventional OIS technology can only correct hand-shake of the user's hand. In addition, there may be a problem that movement of an object is captured by a camera as it is, because there is separately no object position correction signal under a condition that the object moves in real time. Further, in order to minimize the movement of the object, the user should directly move the smartphone according to the movement of the object to capture an image. However, it may be difficult to correct the movement of the object by moving the smartphone, due to vibrations caused by extreme choreography videos or external factors. Therefore, a technology for correcting the movement of the object is required.

A conventional OIS technology may recognize vibrations applied to the camera by a gyro sensor, and may perform hand-shake correction. Therefore, even if a position of the user is fixed, when the object moves, there may always be a problem that it may not properly follow the movement of the object, and may be captured in different positions.

Accordingly, there may be a problem in that qualities of images and photos are worse than expected in an environment in which an object is difficult to be fixed to a central portion thereof, such as an environment in which the object is vibrated or moved largely, an environment in which a single tripod using a rear camera is used, or the like.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

An OIS circuit and an OIS device for object position correction, performing not only hand-shake correction of a user, but also OIS correction for an object position using face position (coordinate) information tracking movement of a face of an object.

In one general aspect, an optical image stabilization (OIS) circuit for object position correction includes a facial detection unit generating a face position signal including coordinate information of a face, based on an image signal input from an image sensor; a hand-shake detector generating a hand-shake position signal corresponding to hand-shake, based on a sensing signal input from a gyro sensor; a operation unit generating a composite position signal based on the face position signal and the hand-shake position signal; and a control unit controlling a position of a lens module, based on the composite position signal.

The facial detection unit may include: a facial recognition unit configured to recognize the face from the image signal input from the image sensor; and a face position detector configured to generate, after recognizing the face by the facial recognition unit, the face position signal including the coordinate information of the face.

The face position detector may be configured to generate, after recognizing a plurality of faces by the facial recognition unit, the face position signal including coordinate information of a central face of a captured image, among the plurality of faces.

The hand-shake detector may include: a gyro filter configured to remove noise and DC offset from the sensing signal input from the gyro sensor, and to pass a filtered sensing signal including a hand-shake frequency; and a gyro integrator configured to integrate the filtered sensing signal input to generate the hand-shake position signal including angle information corresponding to the hand-shake.

The operation unit may include an adder configured to add the face position signal and the hand-shake position signal to generate the composite position signal.

The control unit may include: a feedback operator configured to generate an error signal based on the composite position signal and a feedback signal; a proportional—integral—derivative (PID) controller configured to perform PID control on the error signal to generate a position control signal; a driving unit configured to generate a driving signal based on the position control signal, to drive an actuator; and an analog-to-digital A/D conversion unit configured to convert a position signal input from a position sensor of the actuator into the feedback signal, which is a digital signal, and to output the digital feedback signal to the feedback operator.

The A/D conversion unit may include: an amplifier configured to amplify the position signal input from the position sensor of the actuator; and an A/D converter configured to convert a signal amplified by the amplifier into a digital signal.

In another general aspect, an optical image stabilization (OIS) device for object position correction includes an image sensor capturing a target screen to generate an image signal; a facial detection unit generating a face position signal including coordinate information of a face, based on the image signal input from the image sensor; a gyro sensor generating a sensing signal corresponding to hand-shake; a hand-shake detector generating a hand-shake position signal corresponding to hand-shake, based on the sensing signal input from the gyro sensor; an operation unit generating a composite position signal based on the face position signal and the hand-shake position signal; and a control unit controlling a position of a lens module, based on the composite position signal.

The OIS device may include an actuator configured to adjust positional movement of the lens module under control of the control unit.

The OIS device may include a position sensor configured to sense a position of the lens module moved by the actuator.

The position sensor may be a Hall sensor.

In another general aspect, a camera module includes: a lens module configured to capture an image; and an optical image stabilization device. The optical image stabilization device includes: an object detector configured to generate a first position signal, which includes coordinate information of a target object included in an input image signal corresponding to the image; a shake detector configured to generate a second position signal based on an input sensing signal having a frequency component related to a shake corresponding to the image; an operator configured to generate a composite position signal based on the first position signal and the second position signal; and a controller configured to generate a driving signal for driving the lens module based on the composite position signal.

The camera module may include an actuator configured to adjust positional movement of the lens module based on the driving signal.

The operator may be configured to generate the composite position signal by adding the first position signal and the second position signal.

The target object may be a face.

Other features and aspects will be apparent from the following detailed description, the drawings, and the claims.

BRIEF DESCRIPTION OF DRAWINGS

FIGS. 8A and 8B illustrate states before and after face tracking is applied.

FIGS. 9A and 9B illustrate states before and after face tracking is applied.

Throughout the drawings and the detailed description, the same reference numerals refer to the same elements. The drawings may not be to scale, and the relative size, proportions, and depictions of elements in the drawings may be exaggerated for clarity, illustration, and convenience.

DETAILED DESCRIPTION

Figure 1:
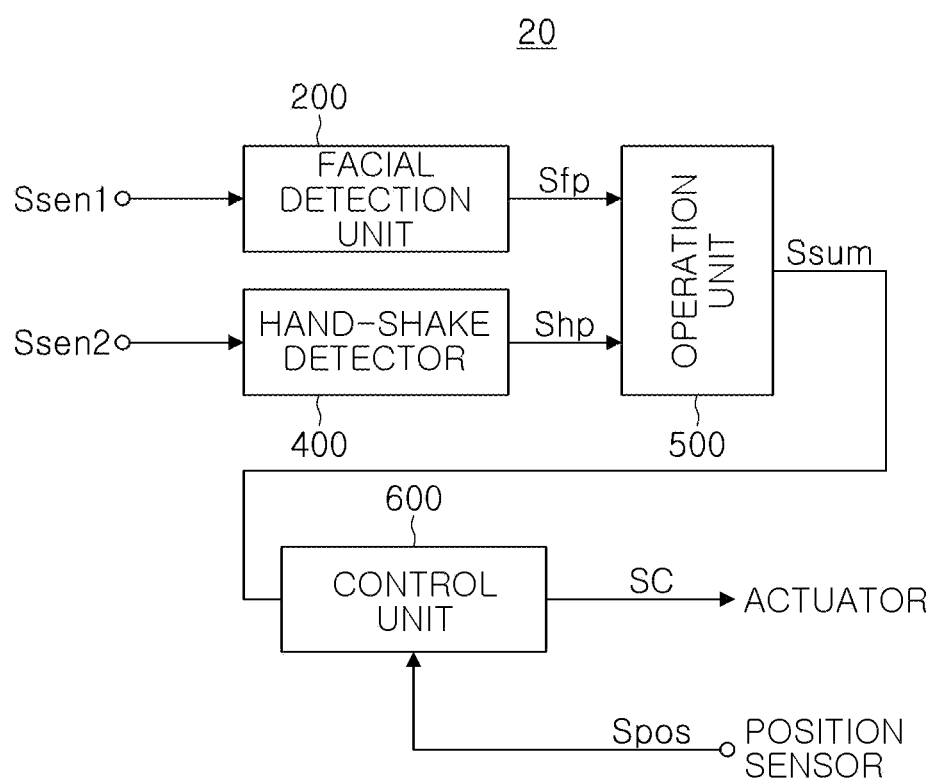
FIG. 1 is a view of an OIS circuit for object position correction, according to an example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Figure 2:
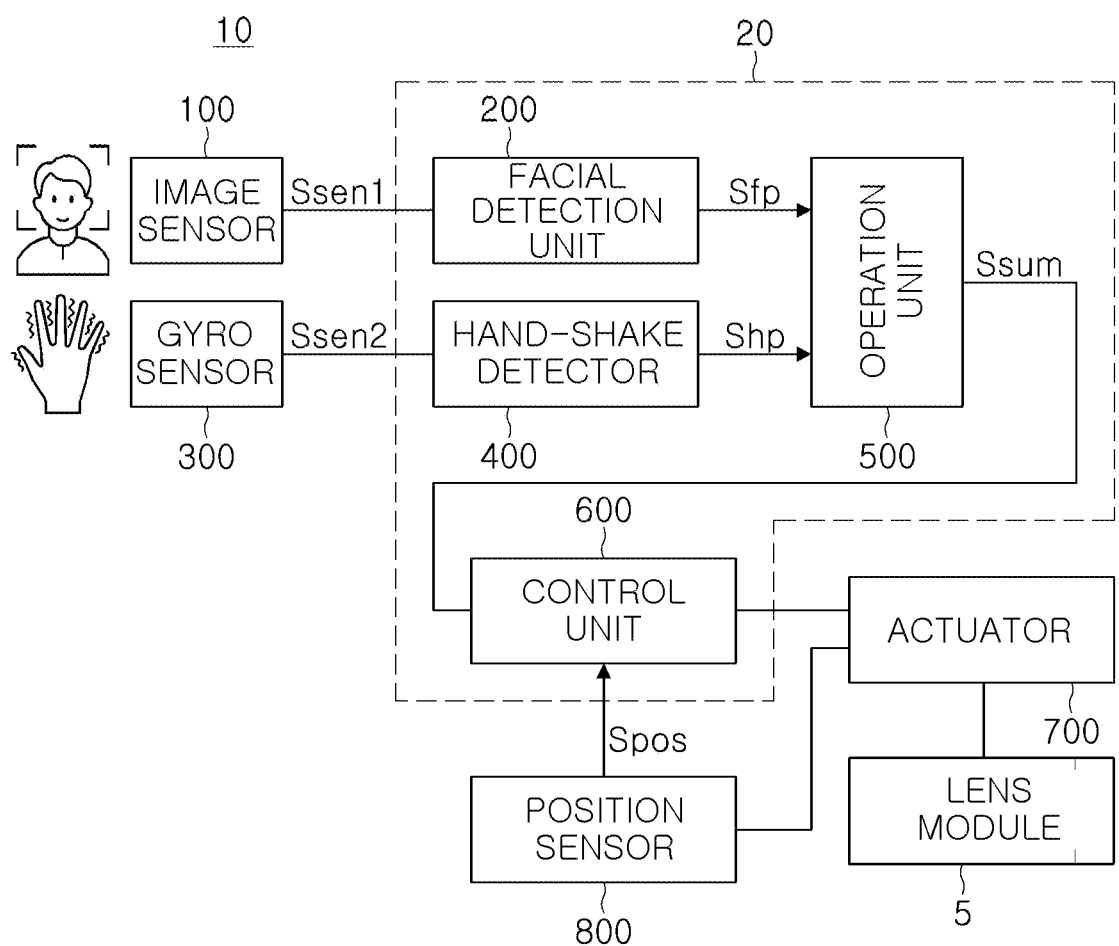
FIG. 2 is a view of an OIS circuit for object position correction, according to an example.

FIG. 1 is a view of an OIS circuit for object position correction, according to an example, and FIG. 2 is a view of an OIS circuit for object position correction, according to an example.

Referring to FIG. 1, an OIS circuit 20 for object position correction may include a facial detection unit 200, a hand-shake detector 400, an operation unit 500, and a control unit 600.

Referring to FIG. 2, an OIS device 10 for object position correction may include an image sensor 100, a gyro sensor 300, and the OIS circuit 20.

The OIS device 10 may further include an actuator 700 and a position sensor 800.

Referring to FIG. 2, the image sensor 100 may be mounted on a camera module. In operating the camera module, the image sensor 100 may capture a target screen to generate an image signal Ssen1 and output the image signal Ssen1 to the facial detection unit 200. For example, the image signal Ssen1 may not include a person, or may include at least one person.

The gyro sensor 300 may be mounted on a camera or an electronic device equipped with the camera, and may generate a sensing signal Ssen2 having angular velocity (degrees per second (dps)) information corresponding to the user's hand-shake, and output the sensing signal Ssen2 to the facial detection unit 200. For example, the sensing signal Ssen2 output from the gyro sensor 300 may include a hand-shake frequency component (e.g., 2 Hz to 20 Hz).

Referring to FIGS. 1 and 2, the facial detection unit 200 may generate a face position signal Sfp including coordinate information of a face, based on the image signal Ssen1 input from the image sensor 100. For example, the facial detection unit 200 may recognize a face from the image signal Ssen1, and may provide a face position signal Sfp including coordinate (X and Y) information of the face.

The hand-shake detector 400 may generate a hand-shake position signal Shp corresponding to hand-shake, based on the sensing signal Ssen2 input from the gyro sensor 300. For example, the hand-shake detector 400 may extract a hand-shake frequency component (e.g., 2 Hz to 20 Hz) from the sensing signal Ssen2 input from the gyro sensor 300, and may provide a hand-shake position signal Shp based thereon.

The operation unit 500 may input/calculate the face position signal Sfp input from the facial detection unit 200 and the hand-shake position signal Shp input from the hand-shake detector 400, to generate a composite position signal Ssum, and may output the composite position signal Ssum to the control unit 600. For example, the operation unit 500 may synthesize the face position signal Sfp and the hand-shake position signal Shp to generate a composite position signal Ssum.

In addition, the control unit 600 may control the actuator 700 to move a position of a lens module 5, based on the composite position signal Ssum input from the operation unit 500. For example, the control unit 600 may use the composite position signal Ssum and a feedback signal, to generate a driving signal for moving the position of the lens module 5 and output the driving signal to the actuator 700.

In addition, referring to FIG. 2, the actuator 700 may adjust positional movement of the lens module 5 under control of the control unit 600. For example, the actuator 700 may include a driving coil disposed in a housing of the camera module, and a magnet disposed in the lens module 5 movable inside the housing. According to the driving signal of the control unit 600, due to an action of driving force generated from the driving coil, the positional movement of the lens module 5 to which the magnet is attached may be adjusted.

The position sensor 800 may sense the position of the lens module 5 moved by the actuator 700 to generate a position signal Spos, and output the position signal Spos to the control unit 600. For example, the position sensor 800 may sense the position of the lens module 5 moved by the actuator 700 to generate a position signal Spos, and output the position signal Spos to the control unit 600.

For each of the drawings, unnecessarily duplicated descriptions may be omitted for the same reference numerals and components having the same functions, and possible differences for each of the drawings may be described.

Figure 3:
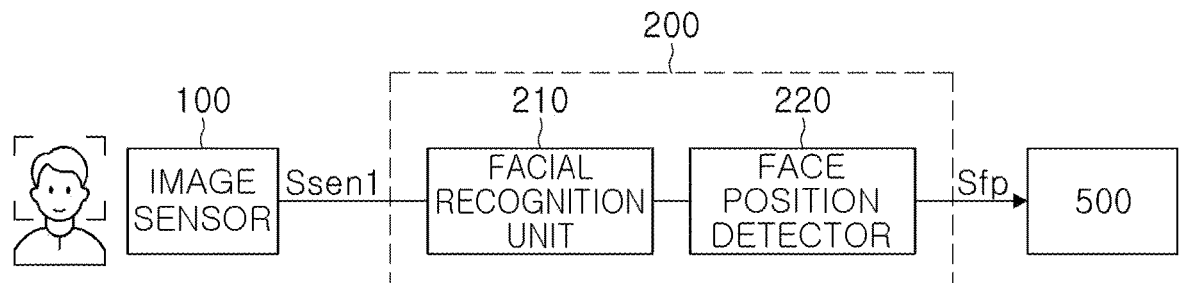
FIG. 3 is a view of a facial recognition unit.

FIG. 3 is a view of a facial recognition unit.

Referring to FIG. 3, a facial detection unit 200 may include a facial recognition unit 210 and a face position detector 220.

The facial recognition unit 210 may recognize a face from an image signal Ssen1 input from an image sensor 100. For example, the facial recognition unit 210 may include a facial recognition function, in order to identify a face from photographic data of the image signal Ssen1, skin color information of the face, position estimation of eyes, a nose, a mouth, or the like, which may be components of the face, composition angles of the eyes, nose, and mouth, patterns of face contrast, or the like may be checked in order, to determine whether a face is present or not. For example, the facial recognition function may include a facial recognition program.

The face position detector 220 may generate, after recognizing the face by the facial recognition unit 210, a face position signal Sfp including coordinate information on the recognized face.

For example, the face position detector 220 may generate, after recognizing a plurality of faces by the facial recognition unit 110, the face position signal including coordinate information of a central face of a captured image, among the recognized plurality of faces.

For example, in the facial recognition operation of the object by the facial recognition unit 210, the face position detector 220 may identify a size and a position of each of the recognized plurality of faces. When a plurality of faces is recognized in the image signal, in order to control only one coordinate of the face closest to the central portion, a face position signal Sfp including a coordinate signal for the central face may be output.

Figure 4:
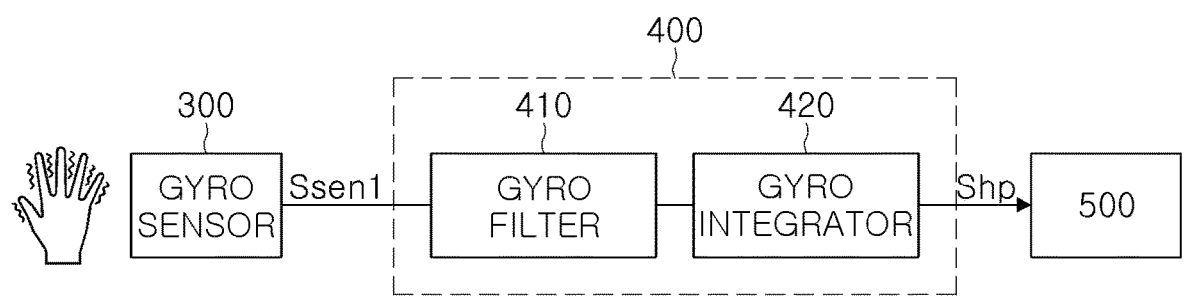
FIG. 4 is a view of a hand-shake detector.

FIG. 4 is a view of a hand-shake detector.

Referring to FIG. 4, a hand-shake detector 400 may include a gyro filter 410 and a gyro integrator 420.

The gyro filter 410 may remove noise and DC offset from a sensing signal Ssen2 input from a gyro sensor 300, and may pass a sensing signal including a hand-shake frequency. For example, when the gyro sensor 300 is a gyroscope based on a micro-electro mechanical system (MEMS), error components such as DC offset, noise, drift, or the like may be included. Therefore, to ensure more accurate performance, offset and noise included in the sensing signal Ssen2 may be removed by the gyro filter 410.

The gyro integrator 420 may integrate the sensing signal input from the gyro filter 410, to generate a hand-shake position signal Shp including angle information corresponding to hand-shake. For example, the gyro integrator 420 may integrate angular velocity (dps, $\omega=\theta/t$) information over time (t) to convert the integrated results into angular ($\theta$) information. The angular velocity, corresponding to hand-shake information, may be converted into a position signal by this process.

Figure 5:
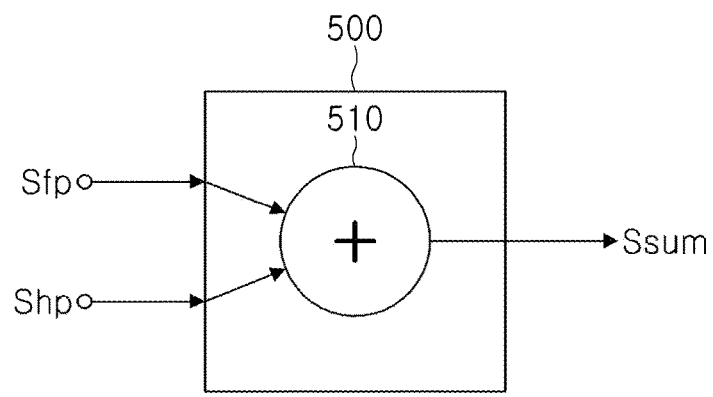
FIG. 5 is a view of an operation unit.
Figure 6:
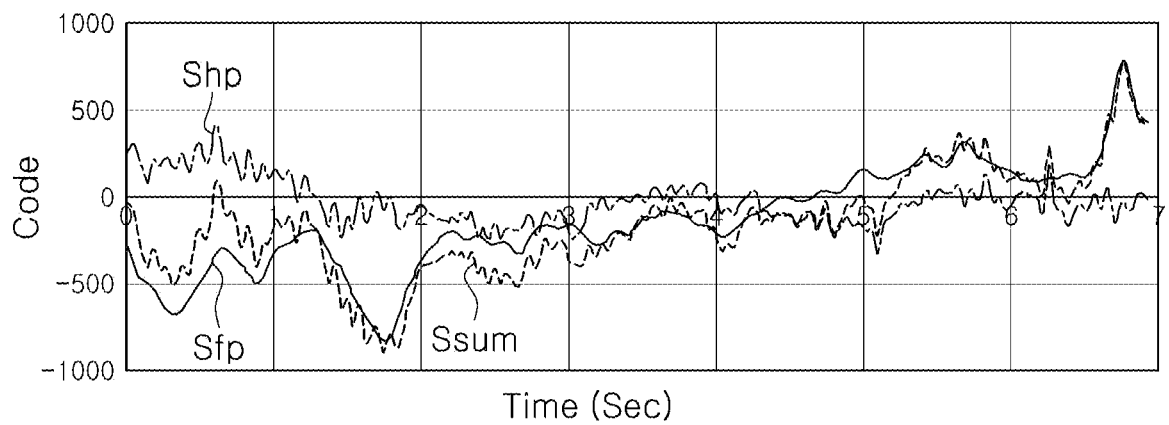
FIG. 6 is a main signal graph of an operation unit.

FIG. 5 is a view of an operation unit, and FIG. 6 is a main signal graph of an operation unit.

Referring to FIGS. 5 and 6, for example, an operation unit 500 may include an adder 510. The adder 510 may add a face position signal Sfp and a hand-shake position signal Shp to generate a composite position signal Ssum.

Referring to FIG. 6, as the composite position signal Ssum is generated by adding the face position signal Sfp to the hand-shake position signal Shp by the operation unit 500, an OIS device according to the various examples may perform position correction of a person's face, in addition to hand-shake correction of a user.

For example, in the operation unit 500, an amount of a change in face position (coordinate) included in the face position signal Sfp, which is approximately 0.1 Hz to about 2 Hz, may be relatively slow, as compared to approximately 2 Hz to 20 Hz, which may be a hand-shake frequency included in a hand-shake detector 400. Therefore, in the calculation process in the operation unit 500, a low pass filter (LPF) capable of removing noise included in the face position (coordinate) may be additionally used.

Figure 7:
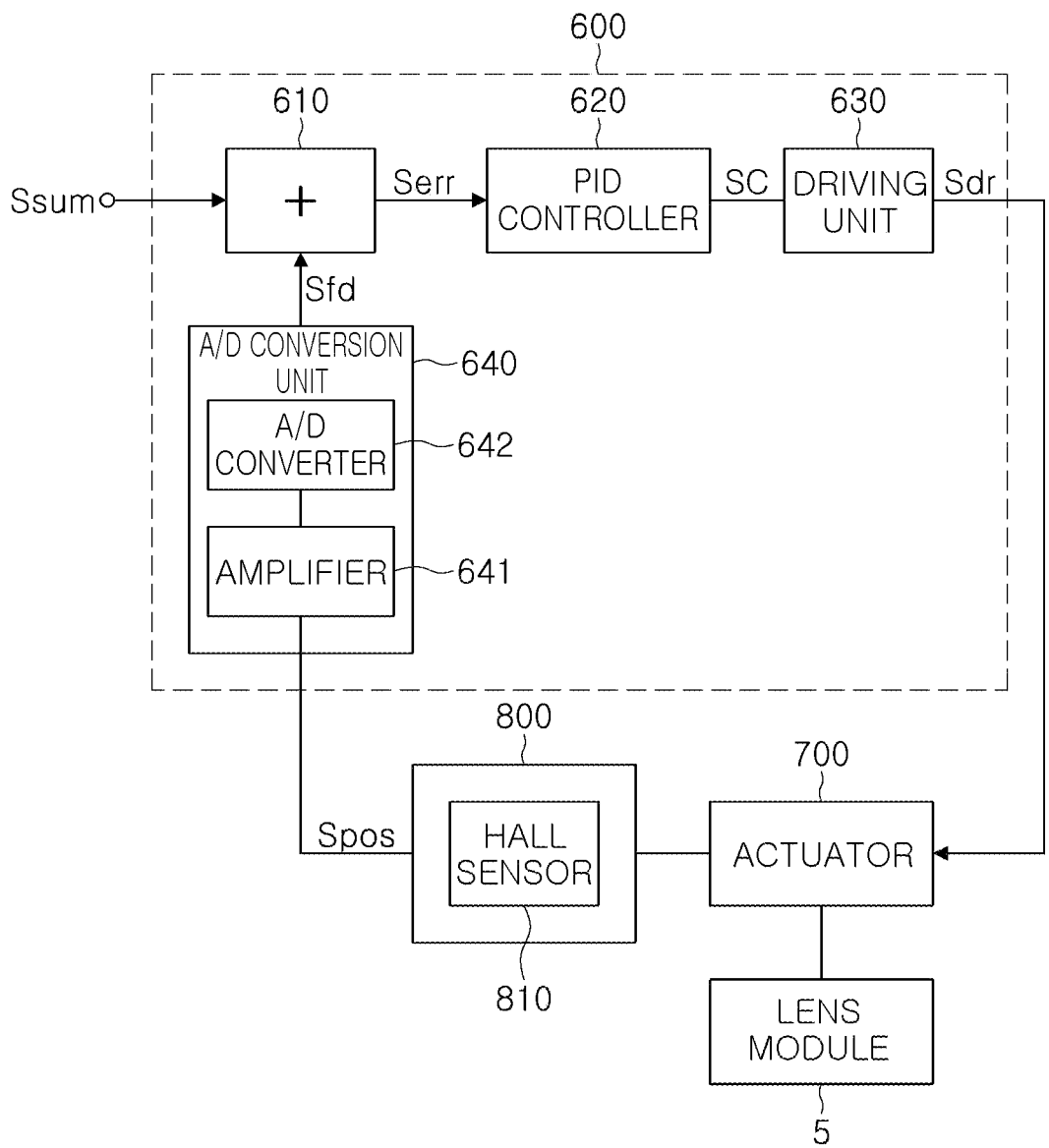
FIG. 7 is a view of a control unit.

FIG. 7 is a view of a control unit.

Referring to FIG. 7, a control unit 600 may include a feedback operator 610, a proportional—integral—derivative (PID) controller 620, a driving unit 630, and an analog-to-digital (A/D) conversion unit 640.

The feedback operator 610 may input/calculate a composite position signal Ssum and a feedback signal Sfd to generate an error signal Serr.

The PID controller 620 may perform PID control on the error signal Serr to generate a position control signal SC.

The driving unit 630 may generate a driving signal Sdr based on the position control signal SC, to drive an actuator 700.

The A/D conversion unit 640 may convert a position signal Spos input from a position sensor 800 of the actuator 700 into the feedback signal Sfd, which is a digital signal, and output the converted feedback signal Sfd to the feedback operator 610.

The A/D conversion unit 640 may include an amplifier 641 and an A/D converter 642.

The amplifier 641 may amplify the position signal Spos input from the position sensor 800 of the actuator 700.

The A/D converter 642 may convert a signal amplified by the amplifier 641 into a digital signal.

For example, the control unit 600 may receive the composite position signal Ssum calculated by an operation unit 500 to calculate a driving direction and a distance for the actuator 700, may change a driving current, based thereon, to drive the actuator 700 in the driving unit 630, and may drive the actuator 700 using the driving current.

The AD conversion unit 640 may receive signal of the position sensor 800 (e.g., a Hall sensor) inside the actuator 700 to receive feedback on a current position of a lens module 5, may convert the received signal into a digital code, and may then output the digital code to the control unit 600 to enable continuous feedback control.

For example, the position sensor 800 may be disposed on a driving coil installed in the actuator 700, and may be a Hall sensor 810 sensing a position of the lens module 5.

FIGS. 8A and 8B illustrate states before and after face tracking is applied, and FIGS. 9A and 9B illustrate states before and after face tracking is applied.

Referring to FIG. 8A and FIG. 9A, when face tracking is not applied, it can be seen that an object may be off a central portion of a screen.

Referring to FIG. 8B and FIG. 9B, when face tracking is applied, it can be seen that the object may be located in the central portion of the screen.

According to face tracking OIS control of the various examples discussed herein, it can be seen that a position of the object and hand-shake of the user are corrected in real time, and a face of a person is always located in the central portion even in an image in which the object moves at high speed.

The above-described examples may employ a method of performing OIS control by adding a face position signal to a hand-shake position signal, and may be thus advantageous for editing a person image and self-capturing on a tripod.

In addition, when capturing a landscape in which the object's face is not recognized, the same OIS as in the conventional method may be performed, and a maximum OIS effect may be obtained when capturing a person without affecting conventional OIS performance.

The control unit 600 in the OIS circuit and the OIS device according to the various examples may be implemented in computing environments (e.g., a peripheral component interconnection (PCI), a USB, firmware (IEEE 1394), an optical bus structure, a network, and the like) in which a processor (e.g., a central processing unit (CPU), a graphics processing unit (GPU), a microprocessor, an application specific integrated circuit (ASIC), a field programmable gate array (FPGA), and the like), a memory (e.g., a volatile memory (e.g., an RAM and the like), a non-volatile memory (e.g., an ROM, a flash memory, and the like)), an input device (e.g., a keyboard, a mouse, a pen, a voice input device, a touch input device, an infrared camera, a video input device, and the like), an output devices (e.g., a display, a speaker, a printer, and the like), and a communication access device (e.g., a modem, a network interface card (NIC), an integrated network interface, a radio frequency transmitter/receiver, an infrared port, a USB connection device, and the like) are interconnected to each other.

The computing environments may be implemented in a distributed computing environment including a personal computer, a server computer, a handheld or laptop device, a mobile device (e.g., a mobile phone, a PDA, a media player, and the like), a multiprocessor system, a consumer electronic, a mini-computer, a mainframe computer, or any of the aforementioned systems or devices, but is not limited thereto.

According to the various examples, not only hand-shake correction of a user, but also OIS correction for an object position using face position (coordinate) information that tracks movement of a face of an object, may be performed to correct not only the hand-shake, but also the movement of the object.

Therefore, there may be an effect that a face of an object is always fixed to a central portion of a screen in capturing videos. In particular, the face of the object is always fixed to a central portion of a screen under conditions where the object wants to be placed in the central portion, such as in capturing videos, in self-capturing on a tripod, or the like, to allow a user to take high quality images and photos intended by the user under any conditions.

In addition, if this function is used, when editing multiple images of the same person captured in various places, since a position of the person's face is always fixed to the same position, it may be advantageous for cross-editing images, and it may be advantageous in tracking an object with less movement, such as in capturing idol performance videos that move at relatively high speed.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical image stabilization (OIS) circuit, comprising:
    a facial detection unit configured to generate a face position signal including coordinate information of a face, based on an image signal input from an image sensor;
    a hand-shake detector configured to generate a hand-shake position signal corresponding to hand-shake, based on a sensing signal input from a gyro sensor;
    an operation unit configured to generate a composite position signal by adding the face position signal to the hand-shake position signal; and
    a control unit configured to control a position of a lens module based on the composite position signal.

2. The OIS circuit of claim 1, wherein the facial detection unit comprises:
    a facial recognition unit configured to recognize the face from the image signal input from the image sensor; and
    a face position detector configured to generate, after recognizing the face by the facial recognition unit, the face position signal including the coordinate information of the face.

3. The OIS circuit of claim 2, wherein the face position detector is configured to generate, after recognizing a plurality of faces by the facial recognition unit, the face position signal including coordinate information of a central face of a captured image, among the plurality of faces.

4. The OIS circuit of claim 1, wherein the hand-shake detector comprises:
    a gyro filter configured to remove noise and DC offset from the sensing signal input from the gyro sensor, and to pass a filtered sensing signal including a hand-shake frequency; and
    a gyro integrator configured to integrate the filtered sensing signal input to generate the hand-shake position signal including angle information corresponding to the hand-shake.

5. The OIS circuit of claim 1, wherein the operation unit comprises an adder,
    wherein the adder is configured to add the face position signal to the hand-shake position signal to generate the composite position signal.

6. The OIS circuit of claim 1, wherein the control unit comprises:
    a feedback operator configured to generate an error signal based on the composite position signal and a feedback signal;
    a proportional—integral—derivative (PID) controller configured to perform PID control on the error signal to generate a position control signal;
    a driving unit configured to generate a driving signal based on the position control signal, to drive an actuator; and
    an analog-to-digital A/D conversion unit configured to convert a position signal input from a position sensor of the actuator into the feedback signal, which is a digital signal, and to output the digital feedback signal to the feedback operator.

7. An optical image stabilization (OIS) device, comprising:
    an image sensor configured to capture a target screen to generate an image signal;
    a facial detection unit configured to generate a face position signal including coordinate information of a face, based on the image signal input from the image sensor;
    a gyro sensor configured to generate a sensing signal corresponding to hand-shake;
    a hand-shake detector configured to generate a hand-shake position signal corresponding to the hand-shake, based on the sensing signal input from the gyro sensor;
    an operation unit configured to generate a composite position signal by adding the face position signal to the hand-shake position signal; and
    a control unit configured to control a position of a lens module based on the composite position signal.

8. The OIS device of claim 7, wherein the facial detection unit comprises:
    a facial recognition unit configured to recognize the face from the image signal input from the image sensor; and
    a face position detector configured to generate, after recognizing the face by the facial recognition unit, the face position signal including the coordinate information of the face.

9. The OIS device of claim 8, wherein the face position detector is configured to generate, after recognizing a plurality of faces by the facial recognition unit, the face position signal including coordinate information of a central face of a captured image, among the plurality of faces.

10. The OIS device of claim 7, wherein the hand-shake detector comprises:
    a gyro filter configured to remove noise and DC offset from the sensing signal input from the gyro sensor, and to pass a filtered sensing signal including a hand-shake frequency; and
    a gyro integrator configured to integrate the filtered sensing signal input to generate the hand-shake position signal including angle information corresponding to the hand-shake.

11. The OIS device of claim 7, wherein the operation unit comprises an adder,
    wherein the adder is configured to add the face position signal to the hand-shake position signal to generate the composite position signal.

12. The OIS device of claim 7, further comprising an actuator configured to adjust positional movement of the lens module under control of the control unit.

13. The OIS device of claim 12, further comprising a position sensor configured to sense a position of the lens module moved by the actuator.

14. The OIS device of claim 13, wherein the control unit comprises:
- a feedback operator configured to generate an error signal based on the composite position signal and a feedback signal;
- a proportional—integral—derivative (PID) controller configured to perform PID control on the error signal to generate a position control signal;
- a driving unit configured to generate a driving signal based on the position control signal, to drive the actuator; and
- an analog-to-digital A/D conversion unit configured to convert a position signal input from the position sensor of the actuator into the feedback signal, which is a digital signal, and to output the digital feedback signal to the feedback operator.

15. The OIS device of claim 13, wherein the position sensor is a Hall sensor.

16. The OIS device of claim 14, wherein the A/D conversion unit comprises:
- an amplifier configured to amplify the position signal input from the position sensor of the actuator; and
- an A/D converter configured to convert a signal amplified by the amplifier into a digital signal.

17. A camera module comprising:
a lens module configured to capture an image; and
an optical image stabilization device comprising:
- an object detector configured to generate a first position signal, which includes coordinate information of a target object included in an input image signal corresponding to the image;
- a shake detector configured to generate a second position signal based on an input sensing signal having a frequency component related to a shake corresponding to the image;
- an operator configured to generate a composite position signal by adding the first position signal to the second position signal; and
- a controller configured to generate a driving signal for driving the lens module based on the composite position signal.

18. The camera module of claim 17, further comprising an actuator configured to adjust positional movement of the lens module based on the driving signal.

19. The camera module of claim 17, wherein the operator is configured to generate the composite position signal by adding the first position signal and the second position signal.

20. The camera module of claim 17, wherein the target object is a face.

* * * * *